US012582136B2

(12) United States Patent (10) Patent No.: US 12,582,136 B2
Barey et al. (45) Date of Patent: Mar. 24, 2026

(54) FAT-BASED COMPOSITIONS

(71) Applicant: CARGILL, INCORPORATED, Wayzata, MN (US)

(72) Inventors: Vanessa Barey, Marcq-en-Baroeul (FR); Abdelfattah Bensouissi, Vilvoorde (BE); Philippe Chouvy, Vilvoorde (BE); Nathalie De Clercq, Mouscron (BE); Nick Vaes, Vilvoorde (BE)

(73) Assignee: Cargill, Incorporated, Wayzata, MN (US)

( * ) Notice: Subject to any disclaimer, the term of this patent is extended or adjusted under 35 U.S.C. 154(b) by 537 days.

(21) Appl. No.: 17/998,225

(22) PCT Filed: May 27, 2021

(86) PCT No.: PCT/US2021/034483
§ 371 (c)(1),
(2) Date: Nov. 8, 2022

(87) PCT Pub. No.: WO2021/242997
PCT Pub. Date: Dec. 2, 2021

(65) Prior Publication Data
US 2023/0225350 A1 Jul. 20, 2023

(30) Foreign Application Priority Data
May 29, 2020 (EP) .................................... 20177552

(51) Int. Cl.
*A23D 9/007* (2006.01)
*A23D 9/04* (2006.01)
(Continued)

(52) U.S. Cl.
CPC ............... *A23D 9/007* (2013.01); *A23D 9/04* (2013.01); *A23G 1/0036* (2013.01); *A23G 1/36* (2013.01); *A23G 1/40* (2013.01); *A23G 1/48* (2013.01)

(58) Field of Classification Search
CPC .................................................... A23D 9/007
See application file for complete search history.

(56) References Cited

U.S. PATENT DOCUMENTS

2016/0324181 A1 11/2016 Hess

FOREIGN PATENT DOCUMENTS

WO 9409649 W 5/1994
WO 2011091962 A1 8/2011
(Continued)

OTHER PUBLICATIONS

Roger Philip Aidoo et al., "Optimization of inulin and polydextrose mixtures as sucrose replacers during sugar-free chocolate manufacture—Rheological, microstructure and physical quality characteristics", Journal of Food Engineering, vol. 126, Apr. 1, 2014, pp. 35-42, XP055742073. GB ISSN: 0260-8774, DOI:10.1016/j.foodeng.2013.10.036.

*Primary Examiner* — Jenna A Watts

(57) ABSTRACT

The invention relates to a reduced-sugar fat-based confectionery composition and to a process for the manufacture of said fat-based confectionery composition. The invention also relates to the use of sucrose having a small particle size distribution D90 and bulking agents for reducing the sugar and/or calories in fat-based confectionery compositions. It also covers the fat-based compositions obtained from the process and the use of said fat-based composition in food products.

10 Claims, 1 Drawing Sheet

Partial fat addition            Remaining additions

Powders step 1            Refiner flakes step 3

Step 1            Step 2            Step 3            Step 4
Weighing + blending   Blending to obtain refiner   Particle size   Blending of
of dry ingredients    paste            reduction through   remaining
                                       roll refining    ingredients

(51) Int. Cl.

| | | |
|---|---|---|
| *A23G 1/00* | (2006.01) | |
| *A23G 1/36* | (2006.01) | |
| *A23G 1/40* | (2006.01) | |
| *A23G 1/48* | (2006.01) | |

(56) References Cited

FOREIGN PATENT DOCUMENTS

| | | | |
|---|---|---|---|
| WO | 2017167965 | A2 | 10/2017 |
| WO | 2018232078 | A1 | 12/2018 |
| WO | 2019023558 | A2 | 1/2019 |
| WO | 2021183558 | A1 | 9/2021 |
| WO | 2021183561 | A1 | 9/2021 |

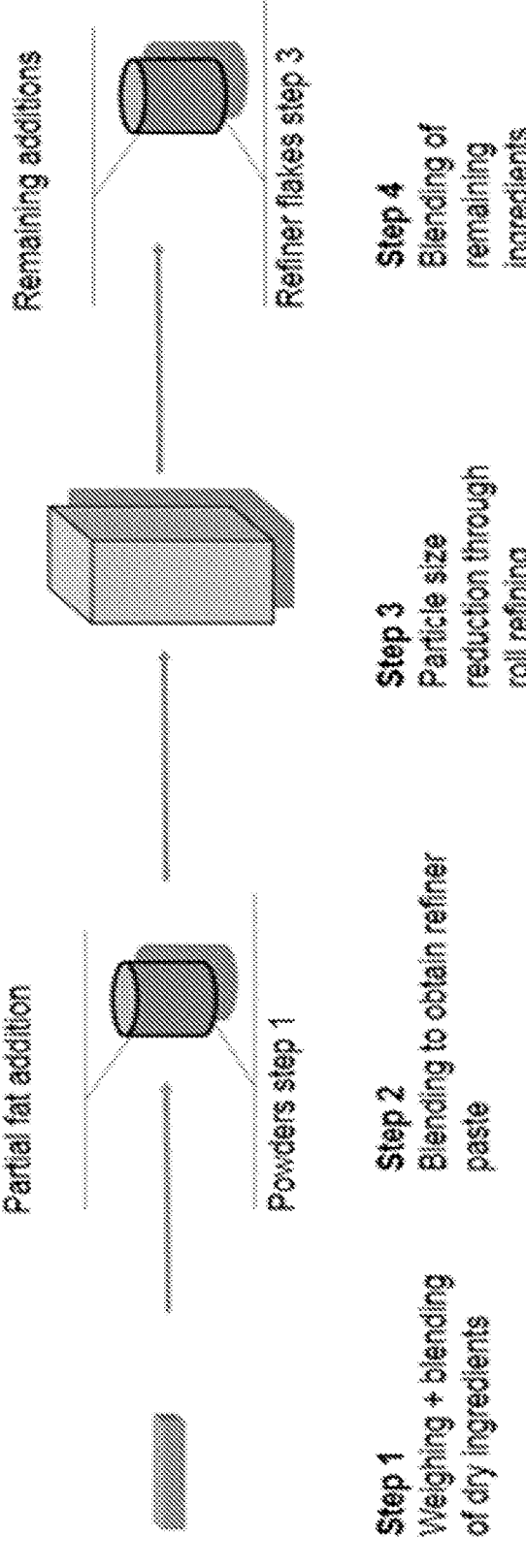

FAT-BASED COMPOSITIONS

CROSS-REFERENCE TO RELATED APPLICATIONS

This application is a national phase of International Patent Application No. PCT/US2021/034483, filed May 27, 2021, which claims the benefit of European Patent Application No. 20177552.5, filed May 29, 2020, and each of which is incorporated by reference herein in its entirety.

FIELD OF THE INVENTION

The invention relates to a fat-based confectionery composition and to a process for the manufacture of said fat-based confectionery composition. The invention also relates to the use of sucrose having a small particle size distribution D90 and bulking agents for reducing the sugar and/or calories in fat-based confectionery compositions.

BACKGROUND OF THE INVENTION

Fat-based confectionery compositions, such as fillings, coatings, chocolates, and chocolate-like compositions are generally indulgent high sugar and high calorie food products.

However, consumers and public health bodies are becoming increasingly concerned about the sugar and fat content of foods and in particular about the sugar content of confectionery products such as chocolate. Sugar has received a lot of negative connotation and many companies & brands now strive to reduce sugar levels in their complete portfolio to satisfy consumer demand A high sugar diet has been linked to a number of health problems. For example, an excessive consumption of such products may cause obesity, may increase the risk of diabetes and other metabolic diseases and may promote the development of dental caries. Confectionery products comprising less sugar and/or fewer calories, which may be termed 'light' and/or 'sugar free' products, are therefore growing in popularity. Sugar-free confectionery is of course particularly popular with those suffering from diabetes.

Accordingly, it would be desirable to provide a fat-based composition having a reduced sugar and/or calorie content, preferably at least 30% sugar reduction by weight. At least a 30% sugar reduction is required in order to claim sugar reduction on the packaging of a food product according to European regulations.

However, nutritive sugars, most often sucrose, play a key role in many fat-based confectionery compositions and products. Sucrose provides the familiar and appealing sweetness that consumers expect from such confectionery products. Many previous attempts of confectionery manufacturers to reduce or replace sugar in confectionery products have been unsuccessful, providing an inferior taste and/or texture compared to the "full sugar" reference products. Therefore, consumer acceptance of such reduced sugar products may be low.

It is generally known to replace all or some of the sucrose in fat-based confectionery compositions and products with substitutes, such as sugar alcohols (also known as polyols) according to regulatory requirements. Sugar alcohols are less sweet than sucrose, but generally provide fewer calories because they are partially or completely indigestible. Unfortunately, as with many other indigestible substances, over-consumption can lead to gastro-intestinal effects such as bloating, diarrhoea and flatulence. There is thus a recommended upper limit for daily consumption of such sugar alcohols, which must be indicated on the label of the confectionery item. Consumers may furthermore have a bias against products which are labelled as containing "artificial sweeteners" or contain E numbers in the list of ingredients.

Erythritol is a sugar alcohol that is better tolerated than the other sugar alcohols, because it is excreted via the kidneys. It is almost as sweet as sucrose (70% relative sweetness) and has a calorie content of just 0.2 kcal/g. However, erythritol has a high negative heat of solution (−180 joules/g) that provides a significant cooling effect in the mouth. This effect works well with mint flavours, e.g. in chewing gums, but can be less desirable in fat-based compositions used for confectionery such as chocolate. Combining erythritol with fibres, such as inulin or FOS, to reduce the cooling effect has been attempted in the past in such applications. Unfortunately, it does not sufficiently overcome the problem of the cooling effect in the mouth and the texture may also be negatively affected. Furthermore, polyols generally have a lower sweetness than sugar, requiring compensation with high intensity sweeteners that may also require an E number listing on the label or that may result in an off-taste or a lingering after-taste, including for instance bitterness.

Other attempts to solve the problem of sugar-reduction, include the use of high-intensity sweeteners, which are much sweeter than standard table sugar. However, these ingredients often have a marked bitter off-taste that needs to be masked. Furthermore, high-intensity sweeteners may be able to provide the sweetness of sucrose, however, they are unable to provide the bulk, texture and mouthfeel provided by sucrose. In order to make up for the bulk, an alternative solution is to increase the fat content. However, although this reduces the overall sugar content, an increased fat content will possibly result in an even higher calorie content than the full-sugar reference.

To summarize, sugar is not only an ingredient that provides sweetness, it also brings beneficial functionalities to many food products, making sugar reduction very challenging. Many attempts at solutions exist, all with their advantages and disadvantages. The ultimate goal is to provide a solution (or combination of solutions) that does not change the functionality, mouthfeel and sweetness perception of the final fat-based composition.

SUMMARY OF THE INVENTION

It is one aim of the present invention, amongst others, to provide a fat-based composition that addresses at least one disadvantage of the prior art, identified herein.

For instance, it is one aim of the present invention to provide a fat-based composition, which comprises a reduced amount of sugars and/or calories than the reference full-sugar fat-based composition.

For instance, it is also an aim of the present invention to provide a fat-based composition, which comprises a reduced amount of sugars and/or calories than the reference full-sugar chocolate composition, whilst maintaining comparable sweetness and/or creaminess and/or mouthfeel, compared to the reference full-sugar fat-based composition.

For instance, it is also an aim of the present invention to provide a simple process to prepare a fat-based composition, which does not require increasing the processing capacity of an existing confectionery line or may even improve the productivity of an existing line without significant capital investment.

For instance, it is also an aim of the present invention to provide a process to prepare a fat-based filling more efficiently.

According to a first aspect of the present invention, there is thus provided:

A method for preparing a fat-based composition comprising the following steps:

a. providing a mixture comprising fat and at least one particulate ingredient;

b. refining the mixture to a particle size distribution D90 of less than 40 µm, preferably less than 35 µm, more preferably less than 30 µm;

c. adding at least one powder ingredient to the refined mixture, wherein the powder ingredient(s) has a particle size distribution D90 of at most 30 µm;

d. mixing the refined mixture with the powder ingredient(s).

Preferably steps c and d are carried out as late as possible in the process, more preferably as the last two steps.

Optionally, wherein at least one emulsifier and/or an additional amount of fat is added and mixed with the refined mixture after step (b), preferably before step (c).

Optionally, the powder ingredient(s) is selected from nutritive sweeteners, bulking agents and combinations of two or more thereof. Preferably, the powder ingredient is selected from sucrose, maltose, dextrose, fructose, lactose, allulose, isomalt, isomaltulose, maltitol, mannitol, erythritol, xylitol and combinations of two or more thereof. Advantageously, the powder ingredient is sucrose.

Optionally, the powder ingredient(s) has a particle size distribution D90 of at most 25 µm, preferably of at most 20 µm.

Optionally, the powder ingredient(s) has a particle size distribution D50 of at most 10 µm, preferably at most 9 µm, more preferably at most 8 µm.

Optionally, the particulate ingredient(s) comprises bulking agents, nutritive sweeteners, non-nutritive sweeteners, dairy-based powders, dairy-alternative powders (e.g. derived from soybean), emulsifiers, flavours, colours, additives and combinations of two or more thereof. Preferably, the particulate ingredient is a bulking agent. More preferably, at least one of the particulate ingredients is a bulking agent.

Optionally, the particulate ingredient(s) comprises a bulking agent selected from a soluble fibre. The soluble fibre can be selected from dextrin, resistant dextrin, resistant/modified maltodextrin, resistant starch, polydextrose, fructo-oligosaccharide, gluco-oligosaccharide, galacto-oligosaccharide, mannose-oligosaccharide, β-glucan, galactomannan, pectin, psyllium, inulin and combinations of two or more thereof.

Optionally, the particulate ingredient(s) comprises a bulking agent selected from an insoluble fibre. The insoluble fibre can be selected from cereal bran (including wheat bran, rice bran, corn bran, oat bran, barley bran), bamboo fibre, fruit fibre, sugar beet fibre, sugar cane fibre, tomato fibre, coconut fibre, straw from cereals such as wheat or barley, pea fibre, tea, coffee, potato fibre, cocoa, cocoa powder, bran waste, sugar waste, cocoa waste, corn-cob waste, cellulose, hemi-cellulose (for example from elephant grass), chitosan, pectins, gums, mucilages, lignins and combinations of two or more thereof.

Advantageously, the fat-based composition according to the invention is substantially free of non-nutritive sweeteners, in particular substantially free of any high-intensity sweeteners.

Optionally, the composition is selected from:
    a filling,
    a coating,
    a spread,
    a dip,
    an enrobing composition,
    a chocolate, or
    a chocolate-like composition.

Particularly preferred is thus, a method for preparing a fat-based composition comprising the following steps:

a. providing a mixture comprising fat and at least one bulking agent, preferably a soluble fibre such as resistant dextrin;

b. refining the mixture to a particle size distribution D90 of less than 40 µm, preferably less than 35 µm, more preferably less than 30 µm;

c. adding sucrose to the refined mixture, wherein the sucrose has a particle size distribution D90 at most 30 µm, preferably at most 25 µm, more preferably at most 20 µm;

d. mixing the refined mixture with the powder ingredient(s) to obtain the fat-based composition.

Preferably steps c and d are carried out as late as possible in the process, more preferably as the last two steps.

All of the optional and preferred features disclosed herein apply likewise to this particularly preferred method.

The invention also covers the fat-based composition obtainable according to the method above, which is preferably a filling, a coating, a spread, a dip, an enrobing composition, a chocolate, or a chocolate-like composition.

The invention also covers the use of at least one powder ingredient, preferably comprising, essentially consisting of or consisting of at least one nutritive sweetener, having a particle size distribution D90 of at most 30 µm, preferably at most 25 µm, more preferably at most 20 µm, and at least one particulate ingredient, preferably comprising, essentially consisting of or consisting of at least one bulking agent, in the manufacture of a food product for reducing the sugar and/or calorie content of the full-sugar reference food product. The nutritive sweetener is preferably a disaccharide, more preferably sucrose. The bulking agent is preferably a soluble fibre, more preferably resistant dextrin. Optionally, the use includes maintaining comparable sweetness and/or mouthfeel of the full-sugar reference food product.

The invention also covers the use of the fat-based composition according the invention for reducing the sugar and/or calorie content of a full-sugar reference food product, whilst preferably maintaining comparable sweetness and/or mouthfeel of said full-sugar reference food product.

The invention also covers a food product comprising the fat-based composition according the invention and other ingredients, wherein the food product is preferably selected from the group consisting of frozen and non-frozen confectionery, baked goods, biscuits and wafers, and dairy products.

FIGURES

FIG. 1 discloses the production process outline to prepare fat-based compositions.

DETAILED DESCRIPTION OF THE INVENTION

1. Ingredients
1.1. Fat
By the term "fat" it is meant herein to also include not just solid fat, but also any edible oil, butter, edible grease and the like and combinations thereof. The "fat" can be selected from animal fats, animal-derived fats or vegetable fats or oils.

The fat can be selected from dairy-based butter, milk fat, lard, tallow, cocoa butter, a cocoa butter equivalent (CBE) (see below section 3.5.1), a cocoa butter replacer (CBR) (see below section 3.5.1), coconut oil, coconut stearin, palm oil, palm kernel oil, palm stearin, palm kernel stearin, palm olein, palm superolein, palm superstearin, palm mid fractions, illipe butter, shea butter, shea oil, soybean oil, cottonseed oil, lauric fat compounds, illipe oil, sal oil, kokum gurgi oil, mango kernel oil, fish oil, avocado oil, sunflower oil, peanut oil, high oleic sunflower oil, corn germ oil, wheat kernel oil, rapeseed oil, safflower oil, flaxseed oil, hemp seed oil, sesame oil, canola oil, olive oil, algal oil, nut oils (such as brazil nut oil, hazelnut oil, almond oil, macademia nut oil), rice bran oil, acai palm oil, jambu oil, graviola oil, tucuma oil, carapa oil, buriti oil, passion fruit oil, pracaxi oil, borneo tallow nut oil, tengkawang nut oil and wherein any of the foregoing oils can be fractionated and/or interesterified and/or partially/fully hydrogenated, and combinations of two or more thereof.

Preferably, the fat is selected from cocoa butter, dairy-based butter, palm oil, coconut oil, sunflower oil, rapeseed oil, and wherein any of the foregoing oils can be fractionated and/or interesterified and/or partially/fully hydrogenated, and CBE and CBR (see section 3.5.1. below).

1.2. Particulate Ingredient

The particulate material that is added to the mixture is selected from bulking agents, nutritive sweeteners, non-nutritive sweeteners, dairy-based powders and plant-based dairy alternative powders.

1.2.1. Bulking Agent

Preferably, the particulate ingredient is a bulking agent. More preferably, at least one of the particulate ingredients is a bulking agent.

More than one bulking agent may be used.

Two or more different soluble fibres from the lists below may be used. Two or more different insoluble fibres from the lists below may be used. A combination of both soluble and insoluble fibres may be used.

By "soluble" it is meant predominantly soluble in water.

By "insoluble" it is meant predominantly insoluble in water.

1.2.1.1. Soluble Fibre

Optionally, the particulate ingredient is a bulking agent selected from a soluble fibre selected from resistant dextrin (also known as resistant/modified maltodextrin), resistant starch, polydextrose, fructo-oligosaccharide, gluco-oligo-saccharide, galacto-oligosaccharide, mannose-oligosaccharide (MOS), polyglycitol (polymers of maltitol), β-glucan, galactomannan, pectin, psyllium, inulin, resistant starch, a trisaccharide and combinations of two or more thereof.

Preferably, the soluble fibre is selected from a resistant dextrin. The term "resistant dextrin" includes herein soluble corn fibre, soluble wheat fibre, digestion resistant maltodextrin. The resistant dextrin may for example be Nutriose® from Roquette. The resistant dextrin may for example be Promitor® Soluble Corn Fibre from Tate & Lyle. The resistant dextrin may for example be Fibersol® or Fibersol-2® from Archer Daniels Midland Company. The resistant dextrin can also be obtained according to the process described in WO2011/091962, which is incorporated herein by reference.

The soluble fibre can also be a MOS obtainable according to the processes described in WO2018/232078, which is incorporated herein by reference.

The soluble fibre can also be a polydextrose obtainable according to the process described in WO2011/091962, which is incorporated herein by reference.

The soluble fibre can also be a trisaccharide, for instance, nigerotriose, maltotriose, maltotriulose, raffinose, kestose, melezitose, isomaltotriose and combinations of two or more thereof.

1.2.1.2. Insoluble Fibre

Optionally, the particulate ingredient is a bulking agent selected from an insoluble fibre selected from bran such as cereal bran (including wheat bran, rice bran, corn bran, oat bran, barley bran), bamboo fibre, fruit fibre, sugar beet fibre, sugar cane fibre, tomato fibre, coconut fibre, straw from cereals such as wheat or barley, pea fibre, tea, coffee, potato fibre, cocoa, cocoa powder, bran waste, sugar waste, cocoa waste, corn-cob waste, cellulose (including microcrystalline cellulose), hemi-cellulose (for example from elephant grass), chitosan, pectins, gums, mucilages, lignins, native starches, modified starches and combinations of two or more thereof.

Moreover, the use of insoluble fibre is a sustainable alternative, as these are often obtained from by-products in the food industry, which can be optionally pre-treated (chemically or physically).

Preferably, the insoluble fibre is selected from bran, such as cereal bran, in particular wheat bran or corn bran. The bran can be size-reduced (for instance micronized) down to a particle size distribution D90 of less than 150 μm, preferably less than 100 μm and/or heat-treated. Particle size reduction and the heat treatment can either occur sequentially (in any order) or simultaneously.

1.2.2. Nutritive Sweetener

Nutritive sweeteners are sugars, such as monosaccharides and disaccharides, and polyols. By "nutritive sweeteners" it is meant herein sweeteners that provide energy in the form of carbohydrates. They are also known as "caloric sweeteners".

Preferably, the particulate ingredients comprise at least one bulking agent and at least one nutritive sweetener.

More than one nutritive sweetener may be used.

1.2.2.1. Monosaccharides

Suitable monosaccharides include glucose (also known as dextrose), either in the form of glucose anhydrate or in the form of glucose monohydrate, fructose in crystalline or semi-crystalline form, and any other known monosaccharide, such as galactose, mannose, allulose, ribose, xylose, tagatose etc. and combinations of two or more thereof.

The glucose and/or fructose can also be in the form of dried glucose and/or fructose syrups having a DE of from 20 to 40. Glucose and/or fructose syrups can also be prepared by the controlled acid or enzymatic hydrolysis of starch, for instance corn starch.

1.2.2.2. Disaccharides

Suitable disaccharides include sucrose (also known colloquially as sugar or table sugar or standard table sugar), maltose, lactose, lactulose, trehalose, cellobiose, isomaltulose, and a combination of two or more thereof.

The term "sucrose" as used herein includes sucrose in various forms including but not limited to standard (e.g. granulated) table sugar, powder sugar, pearl sugar, soft white sugar, caster sugar, icing sugar, sugar syrup, silk sugar, unrefined sugar, crystal sugar, fine sugar, ultrafine sugar. The sucrose can be obtained from sugar cane, sugar beet, sugar maple sap, date palm, sorghum. The sucrose can also be in the form of raw or unrefined or whole cane sugar, or brown sugar or molasses.

Preferably, the mixture in step (a) comprises at least one particulate ingredient comprising, essentially consisting of or consisting of sucrose.

1.2.2.3. Polyols

Polyols include, for example, erythritol, mannitol, maltitol, sorbitol, xylitol, isomalt, lactitol, and a combination of two or more thereof.

Preferably, the fat-based composition according to the invention is substantially free of polyols.

1.2.3. Non-Nutritive Sweeteners

The particulate ingredients can include non-nutritive sweeteners. By "non-nutritive sweeteners" it is meant herein sweeteners that generally do not provide caloric energy, but do provide a sweet taste. They are also known as "non-caloric sweeteners".

Non-nutritive sweeteners include, for example, high intensity sweeteners.

High intensity sweeteners include aspartame, advantame, acesulfame salts such as acesulfame-k, cyclamates, saccharin, sucralose, neohesperidin dihydrochalon, alitame, neotame, stevia, stevia-leaf extracts, glycosides such as steviosides or rebaudiosides e.g. rebaudioside A or M, mogrosides (and other sweeteners found in monk fruit), glycyrrhizin, monellin, thaumatin, brazzein, or any combination of two or more thereof.

Preferably, if present, the high intensity sweetener is stevia, a stevia leaf extract or a glycoside e.g. rebaudioside A or M.

Preferably, the fat-based composition according to the invention is substantially free of high-intensity sweeteners.

1.2.4. Dairy-Based Powders

The dairy-based powders are preferably selected from but not limited to skimmed milk powder, full fat milk powder, caramelized milk powder, (sweet) whey powder, lactose, skimmed yoghurt powder, full fat yoghurt powder, cream powder and combinations of two or more thereof.

1.3. Powder Ingredient(s)

The powder ingredient(s) to be added after the refining step to the refined mixture are selected from bulking agents and nutritive sweeteners as listed under Sections 1.2.1. and 1.2.2. respectively, and combinations of two or more thereof.

The powder ingredient(s) may also comprise or essentially consist of the dry-blends disclosed in EP20161754.5 and the dried and recrystallised blends (which are then size-reduced to the required D90) disclosed in EP20161793.3.

The choice of powder ingredient(s) will depend on the desired type of end composition. For instance, a sugar free fat-based composition will preferably comprise a bulking agent and/or polyol as at least one of the powder ingredients. However, for a reduced sugar fat-based composition, the powder ingredient(s) will preferably comprise sucrose.

The difference between the powder ingredient(s) in step (c) and the particulate ingredient(s) in step (a) is the particle size. The powder ingredient(s) must have a particle size distribution D90 of at most 30 μm, preferably at most 25 μm, more preferably at most 20 μm. Optionally, the powder ingredient(s) also has a particle size distribution D50 of at most 10 μm, preferably at most 9 μm, more preferably at most 8 μm. The lower limit of the particle size distribution D90 is greater than zero, but may be negligible depending on the limit of detection of the equipment used to measure the particle size.

If more than one powder ingredient is being used, all powder ingredients must have a particle size distribution D90 of at most 30 μm, preferably at most 25 μm, preferably at most 20 μm.

Preferably, the powder ingredient(s) comprises, essentially consists of, or consists of sucrose having a particle size distribution D90 of at most 30 μm, preferably at most 25 μm, preferably at most 20 μm. Optionally, the sucrose has a particle size distribution D50 of at most 10 μm, preferably at most 9 μm, more preferably at most 8 μm. The sucrose can thus be a size-reduced powder sugar, fine sugar, refined sugar, ultrafine sugar, silk sugar etc.

Advantageously, the powder ingredient(s) comprises, essentially consists of, or consists of silk sugar, such as the silk sugar manufactured by British Sugar Plc. Silk sugar is a sugar preferably having a particle size distribution D90 of at most 30 μm, or at most 25 μm, or at most 20 μm. Silk sugar may have a D50 particle size of at most 15 μm, or at most 10 μm, or at most 9 μm, or at most 8 μm. More preferably, silk sugar has a D90 particle size of 20 μm and a D50 particle size of 8 μm.

Without being bound by theory, according to the prior art method, it is thought that by adding standard table sugar, which has a D90 of about 1000 μm, and optionally other particulate ingredients, such as bulking agents (e.g. soluble or insoluble fibres), to the mixture in step (a) and then refining it down together with the fat to a D90 of less than 35 μm, preferably less than 30 μm, the sucrose becomes very embedded in the food matrix and interacts substantially with the other ingredients. Hence, despite the small particle size after refining, the sugar is not readily accessible by the taste receptors in the mouth. Thus, dissolution and sweetness perception in the mouth is limited. Despite the use of bulking agents to partially replace some of the sugar, a fat-based composition according to the prior art, the same level of sweetness as the full-sugar reference cannot be achieved without adding further non-nutritive sweeteners.

Without being bound by theory, the inventors of the current method and fat-based composition according to the invention, have surprisingly found that by adding a powder ingredient(s) with a relatively small particle size, preferably comprising, essentially consisting of, or consisting of sucrose, to an already refined mixture, the powder ingredient(s) are then in fact less embedded in the food matrix. Is it thought that the powder ingredient(s), although homogeneously dispersed in the refined mixture, can dissolve surprisingly more quickly in the oral cavity by being added after the refining step. This rapid dissolution leads to an enhanced perception of sweetness, because it means that more of the sweetener composition is tasted by the tongue before being swallowed. Thus, less sugar and powder ingredient(s) are needed to achieve the same or comparable level of sweetness.

Thus, the powder ingredient(s), preferably comprising, essentially consisting of, or consisting of sucrose, can be used to boost the sweetness of a food product together with a bulking agent. More bulking agent can be used to replace the overall sucrose content without significantly affecting taste and texture.

The relatively small particle size also provides good mouthfeel to the final product as the composition will not be perceived as gritty or grainy or gummy in texture. An additional surprising advantage of the invention, is that it has been observed that the composition becomes much creamier when using powder ingredient(s), preferably comprising, essentially consisting of, or consisting of sucrose, after refining, than by adding the same ingredient with a bigger particle size (as a particulate ingredient) before refining. Again, without being bound by theory, it is thought that this is a surprising result of the powders being less embedded and linked to the other ingredients, in particular the fat.

Furthermore, without being bound by theory, it can be assumed that a very fine nutritive sweetener or bulking agent would interact with the fat differently than a coarse nutritive sweetener/bulking agent that then needs to be refined. Fat is an important ingredient in the composition, known for its ability to crystallize. We would assume that the granulometry of the sugar would influence the crystallization of the fat. Thus, adding the very fine nutritive sweetener/bulking agent at the end of the process is thought to positively affect the inherent structure of the fat, allowing for the creamier texture.

1.3.1. Particle Size and Particle Size Reduction

According to the present invention particle size, i.e. granulometry, is defined using D90. The D90 value is a common method of describing a particle size distribution. "D90" refers to is the volume diameter where 90% of the volume distribution of the particles is below this value. In other words, in a cumulative distribution of the maximum particle dimension in a sample of particles, 90% of the distribution lies below the D90 value. "D50" refers to the value of the maximum particle dimension (for example, the diameter for a generally spherical particle) where 50% of the volume of the particles in the sample have a maximum particle dimension below that value. In other words, in a cumulative distribution of the maximum particle dimension in a sample of particles, 50% of the distribution lies below the D50 value.

"Maximum dimension" or "maximum particle dimension" refers to the longest cross-sectional dimension of any particular particle, e.g. a carbohydrate crystal, a particle of bulking agent, or particle of the final sweetener composition.

The particle size distribution values, such as D90 or D50, may be measured for example by a laser light diffraction/scattering particle size analyzer as described further below. Other known measurement techniques for particle size may also be used depending on the nature of the sample. The particle size distribution values, such as D90 or D50, of powders may conveniently be measured by digital image analysis (such as using a CAMSIZER XT® as sold by Retsh GmbH) while the particle size distribution values, such as D90 or D50, of particles comprised within a fat-based composition may be measured by laser light scattering. Particle size may be measured using any known method using suitable equipment. One device that is commonly used is a Malvern Mastersizer 3000 as sold by Malvern Panalytical Ltd.

Any particle size reduction technique that is known in the art may be used to obtain powder ingredient(s) suitable for the present invention, such as milling, micronization, grinding, extrusion, high pressure homogenization, abrasion, fractionation, or pulverizing. A combination of particle size reduction techniques may also be used.

Any known milling method may be used. For example, ball-milling, wet-ball milling, or micro-milling in an impact mill.

Micronization may be used to provide very fine particles (e.g. less than 100 microns). Micronization methods are known in the industry. For example, WO2017/167965, which is incorporated herein by reference, describes a micronized material. Micronization involves heat-treating the material and then milling at high speed (e.g. at least 3000 rpm) using a high performance mill, such as a cell mill or jet mill.

A cell mill is a highly efficient mechanical mill with multiple rotors mounted on a vertical shaft. Product quality is optimised by control of mill speed through a frequency inverter, which also limits the starting current. A cell mill results in two product streams, standard (or product) and oversize, the standard stream is the preferred output.

A jet mill (also known as a microniser) typically comprises a spiral jet which uses compressed gas to produce superfine materials by autogenous comminution. Feed material is inspirated by a small proportion of the compressed gas through a venturi into the grinding chamber where numerous angles nozzles accelerate the material into particle-particle impact. There are no moving parts in the mill and no mechanical forces are applied to the grinding process. Variation in gas pressure and residence time is possible.

The particle size reduction technique may be cryogenic. Cryogenic techniques are particularly useful where there is a need to control or reduce the stickiness of the particles.

The particle size reduction technique may also include size classification and/or separation steps (e.g. sieving or sifting). For example, a TTC/TTD Air Classifier® or Mikro® Acucut Air classifier model sold by Hosokawa Micron Powder Systems may be used.

1.4. Emulsifiers

The fat-based composition of the present invention may further comprise one or more emulsifier(s). The most commonly used emulsifier is lecithin. Suitable emulsifiers include lecithin derived from either soya bean, safflower, sunflower or corn; fractionated lecithins enriched with either phosphatidyl choline, phosphatidyl ethanolamine, phosphatidyl inositol; emulsifiers derived from oats, mono and diglycerides and their tartaric esters, monosodium phosphate derivatives of mono- and diglycerides of edible fats and oils, sorbitan monostearate, sorbitan tristearate, sucrose esters, polyoxyethylene sorbitan monostearate, hydroxylated lecithin, synthetic phospholipids such as ammonium phosphatides, lactylated fatty acid esters of glycerol and propylene glycol, polyglycerol esters of fatty acids, propylene glycol mono- and diesters of fats and fatty acids.

Other emulsifiers include polyglycerol polyricinoleate (PGPR), polyglycerol ester (PGE), whey proteins, milk proteins, sodium caseinate, lysolecithin, fatty acid salts, lysozyme, sodium stearoyl lactylate, calcium stearoyl lactylate, lauroyl arginate, sucrose monooleate, sucrose monostearate, sucrose monopalmitate, sucrose monolaurate, sucrose distearate, sorbitan monooleate, sorbitan monostearate, sorbitan monopalmitate, sorbitan monolaurate, and sorbitan tristearate.

It is preferred to use at least one or more of (fractionated) lecithin, polyglycerol polyricinoleate (PGPR), ammonium phosphatide, and mono- and diglycerides as the emulsifier.

Optionally, the emulsifier is added after the refining step (b) of the method according to the invention. The emulsifier can be added together with fat or separately. This can occur before, during or after step (d).

Optionally, a part or all of the emulsifier is included in the mixture of step (a) and any remaining amount of the emulsifier is added after the refining step (b) of the method according to the invention, either before, during or after step (c) and/or step (d). The emulsifier can be added together with fat or separately.

1.5. Other Optional Ingredients: Cocoa Solids, Milk Chocolate Crumb, Flavours, Colours, Texturizers, Proteins and Other Additives The fat-based composition of the present invention may further comprise other optional ingredients, such as cocoa solids, flavours, colours, texturizers, proteins, additives and combinations of two or more thereof.

The cocoa solids are selected from one or more of cocoa powder (including natural cocoa powder, alkalized cocoa powder, and fat-reduced cocoa powder), cocoa liquor (in the form of a paste comprising cocoa-based solids and fats) and combinations of two or more thereof. If cocoa solids are present, optionally, the method further comprises a step (b') of conching the mixture after step (b) and prior to step (c); and optionally a step (e) of solidifying the mixed refined mixture to obtain a chocolate or chocolate-like composition. During the conching step (b') an additional amount of fat can be added, preferably to liquify the mixture.

The fat-based composition may also comprise a milk crumb or milk chocolate crumb. Milk chocolate crumb is a vacuum dried, crystallized mixture made from milk, sugar and cocoa liquor. If there is no cocoa liquor in it, it is called milk crumb or blokmilk. Both crumb products are typically used as ingredients for milk chocolate.

Flavours can be any suitable synthetic or natural flavours such as caramel, cinnamon, vanilla, orange and mint, almond, fruit extracts, vegetable extracts such as tomato, carrot, onion, chili and/or garlic extracts, spices, herbs, etc.

The texturizer can be any hydrocolloid, such as e.g. xanthan gum, carrageenan, locust bean gum, alginate, and the like.

The proteins may be selected from animal sources. For example, from dairy products, such as milk or whey, from egg, such as from egg white powder, from insect protein or from meat and fish sources. The proteins may be selected from vegetable sources. For example, from pea protein, wheat protein, corn protein, soy protein or nut protein.

The fat-based composition of the present invention may also comprise anti-caking or free flowing agent including but not limited to a silica based agent, calcium stearate, magnesium stearate, and/or extra dry starch. Examples of other optional ingredients include, but are not limited to, carob, malt, salt, nut, fruit, vitamins, minerals, antioxidants, masking agents, healthy fats, omega-3 fatty acids and the like.

Preferably, a part or all of the optional ingredient(s) are included in the mixture of step (a) prior to the refining step (b). However, a part or all of the optional ingredient(s) can also be added after the refining step, so long as the particle size distribution D90 of those optional ingredient(s) added after refining are at most 30 μm, preferably at most 25 μm, more preferably at most 20 μm.

2. Method of Preparing the Fat-Based Composition 2.1. Step a) Providing a Mixture The mixture is prepared by thoroughly mixing the particulate ingredient(s) and at least a part of the fat and to obtain a homogeneous mixture.

Any mixer known in the art for preparing pre-refined fat-based mixtures can be used e.g. planetary mixers or Z blade mixers. The mixture is a suspension i.e. a dispersion of the particulate ingredient(s) in the fat matrix.

Preferably, mixing is carried out a temperature at least >5° C., preferably at least >10° C. higher than the melting point of the mixture e.g. for instance at about 50° C.

Mixing can be carried out preferably for a period of from 10 to 30 minutes, more preferably from 10 to 15 min, or simply until homogeneous. The shear rate will depend on the type of mixing equipment used and will be shear rate commonly used in the art.

The fat and particulate ingredient(s) respectively may be present in the mixture of step (a) in an amount by weight according to the ratio of fat:particulate ingredient(s) of 99:1, or 98:2, or 97:3, or 96:4, or 95:5, or 90:10, or 85:15, or 80:20, or 75:25, or 70:30, or 65:35, or 60:30, or 55:45, or 50:50, or 45:55, or 40:60, or 35:65, or 30:60, or 25:75, or 20:80, or 15:85, or 10:90, or 5:95, or 4:96, or 3:97, or 2:98, or 1:99. The fat and particulate ingredient(s) may also be present in the sweetener composition in an amount by weight within a range formed by a combination of the end points from any two of the above list of ratios.

The ratio of fat to particulate ingredient will depend on the type of fat-based composition being prepared and the type and amount of particulate ingredient included in step (a).

Preferably, for fillings, coatings, dips, spreads, enrobing compositions: the ratio of fat to particulate ingredient(s) can be from 60:40 to 40:60, preferably from 50:50 to 55:45.

Preferably, for chocolate and chocolate-like compositions: the ratio of fat to particulate ingredient(s) can be from 25:75 to 40:60, preferably from 30:70 to 35:65.

The fat may be present in the mixture in an amount of 99%, 98%, 97%, 96%, 95%, 90%, 85%, 80%, 75%, 70%, 65%, 60%, 55%, 50%, 45%, 40%, 35%, 30%, 25%, 20%, 15%, 10%, 5%, 4%, 3%, 2%, or 1% by weight. The fat may also be present in the mixture in an amount by weight within a range formed by a combination of any two values from the above list of percentages. Preferably, the fat is present in the mixture in an amount sufficient to provide a continuous fat phase in which the particulate ingredient(s) can be dispersed.

Optionally, only a part of the fat of the fat-based composition is provided in the mixture of step (a). The remainder of the fat can be added after the refining step either before, during or after step (c) and/or (d). In this case, at least 1%, at least 5%, at least 10%, at least 20%, at least 30%, at least 40%, at least 50%, at least 60%, at least 70%, at least 80%, at least 90%, at least 95%, at least 99% in an amount by weight of fat of the fat-based composition is provided in the mixture of step (a).

The particulate ingredient(s) may be present in the mixture in an amount of 99%, 98%, 97%, 96%, 95%, 90%, 85%, 80%, 75%, 70%, 65%, 60%, 55%, 50%, 45%, 40%, 35%, 30%, 25%, 20%, 15%, 10%, 5%, 4%, 3%, 2%, or 1% by weight. The particulate ingredient(s) may also be present in the mixture in an amount by weight within a range formed by a combination of any two values from the above list of percentages.

The bulking agent(s), preferably soluble or insoluble fibre, more preferably resistant dextrin, may be present in the mixture in an amount of 99%, 98%, 97%, 96%, 95%, 90%, 85%, 80%, 75%, 70%, 65%, 60%, 55%, 50%, 45%, 40%, 35%, 30%, 25%, 20%, 15%, 10%, 5%, 4%, 3%, 2%, or 1% by weight. The bulking agent(s) may also be present in the mixture in an amount by weight within a range formed by a combination of any two values from the above list of percentages. Preferably, the bulking agent(s) is present in the mixture in an amount sufficient to provide a bulking effect.

2.2. Step b) Refining

The term "refining", as used herein in relation to all aspects of the invention, will be well-known to those skilled in the art and refers to a step of particle size reduction. The term "refining" may be synonymous with milling.

The refining step is selected from roll-refining, ball-refining, knife-refining, dry-grinding and micronizing.

The refining step may be carried out using a ball mill or roll refiner, preferably a roll refiner, more preferably a 5 roll refiner.

Standard conditions known in the art and by the skilled person can be used.

The mixture from step (a) is refined to a particle size distribution D90 of less than 40 μm, preferably less than 35 μm, more preferably less than 30 μm. Section 1.3.1 regarding particle size distribution applies.

The skilled person will know how much fat needs to be added in order to refine the mixture.

2.3. Step c) Adding Powder Ingredient

After the refining step, the powder ingredient(s) are added to the refined mixture. This is preferably done with the temperature of the refined mixture at at least >5° C., preferably at least 10° C. above the melting temperature of the refined mixture. Most preferably, the powder ingredient(s) should be added as late as possible in the process i.e. after refining and even after the addition of any additional fat and/or emulsifier(s) after refining.

An amount of 99%, 98%, 97%, 96%, 95%, 90%, 85%, 80%, 75%, 70%, 65%, 60%, 55%, 50%, 45%, 40%, 35%, 30%, 25%, 20%, 15%, 10%, 5%, 4%, 3%, 2%, or 1% by weight of powder ingredient(s) (based on the total weight of the fat-based composition) may be added to the refined mixture. The powder ingredient(s) may also be added in an amount by weight (based on the total weight of the fat-based composition) within a range formed by a combination of any two values from the above list of percentages. Preferably, the at least one powder ingredient is added to the refined mixture in an amount sufficient to provide an enhanced sweetening effect. Preferably, the powder ingredient(s) comprises, essentially consists of, or consists of sucrose.

Without being bound to theory, it is thought that adding powder ingredients having a very small particle size after the refining step, means that the powder ingredients interact less with the other ingredients in the fat-based composition. Hence, their sensory functionalities are more accessible upon consumption of the composition. For example, if the powder ingredient is a nutritive sweetener, such as sucrose and particular a sucrose such as silk sugar having a D90 of about 20 μm or less (and optionally a D50 of about 10 μm or less), the perceived sweetness and creaminess of the composition is increased, even when using 30% less sucrose overall, compared to the full-sugar reference fat-based composition. The bulking properties of the sucrose can be achieved by replacing part of the sugar with a bulking agent, such as a soluble fibre, in particular a resistant dextrin. The bulking agent can be added prior to refining as one of the particulate ingredients.

Optionally, only a part of the fat of the fat-based composition is provided in the mixture of step (a) and the remainder of the fat can be added after the refining step, either with, before or after the addition of the powder ingredient(s). In this case, at most 1%, at most 5%, at most 10%, at most 20%, at most 30%, at most 40%, at most 50%, at most 60%, at most 70%, at most 80%, at most 90%, at most 95%, at least 99% in an amount by weight of fat of the fat-based composition is added to the refined mixture.

2.4. Step d) Mixing

The refined mixture and the powder ingredient(s) are then thoroughly mixed to obtain a homogenous fat-based composition.

According to the present invention, mixing may be carried out by means of any suitable equipment known in the art. A non-exhaustive list of types of devices that can be used may include ribbon mixers, paddle mixers, vertical mixers, tumble mixers, and thermal screws. Mixing may be carried out under low, medium, or high shear, and is carried out for an amount of time sufficient to obtain a homogeneous composition.

The method according to the invention is thus suitable for preparing a sugar-reduced fat-based composition. By "sugar-reduced" it is not meant that sugar present in a composition is physically removed from the composition. It is meant that compared to a reference full-sugar fat-based composition, the method according to the present invention results in a fat-based composition that comprises less overall sugar.

3. The Fat-Based Composition 3.1. Properties

The fat may be present in the fat-based composition in an amount of 85%, 80%, 75%, 70%, 65%, 60%, 55%, 50%, 45%, 40%, 35%, 30%, 25%, 20%, 15% by weight. The fat may also be present in the fat-based composition in an amount by weight within a range formed by a combination of any two values from the above list of percentages. Preferably, the fat is present in the fat-based composition in an amount sufficient to provide a continuous fat phase in which the particulate and powder ingredient(s) can be dispersed.

The particulate ingredient(s) may be present in the fat-based composition in an amount of 85%, 80%, 75%, 70%, 65%, 60%, 55%, 50%, 45%, 40%, 35%, 30%, 25%, 20%, 15%, by weight. The particulate ingredient(s) may also be present in the fat-based composition in an amount by weight within a range formed by a combination of any two values from the above list of percentages.

The bulking agent(s) may be present in the fat-based composition in an amount of 99%, 98%, 97%, 96%, 95%, 90%, 85%, 80%, 75%, 70%, 65%, 60%, 55%, 50%, 45%, 40%, 35%, 30%, 25%, 20%, 15%, 10%, 5%, 4%, 3%, 2%, or 1% by weight. The bulking agent(s) may also be present in the fat-based composition in an amount by weight within a range formed by a combination of any two values from the above list of percentages. Preferably, the bulking agent(s) is present in the fat-based composition in an amount sufficient to provide a bulking effect.

The powder ingredient(s) may be present in the fat-based composition in an amount of 99%, 98%, 97%, 96%, 95%, 90%, 85%, 80%, 75%, 70%, 65%, 60%, 55%, 50%, 45%, 40%, 35%, 30%, 25%, 20%, 15%, 10%, 5%, 4%, 3%, 2%, or 1% by weight. The powder ingredient(s) may also be present in the fat-based composition in an amount by weight within a range formed by a combination of any two values from the above list of percentages. Preferably, the powder ingredient(s) is present in the fat-based composition in an amount sufficient to provide an enhanced sweetening effect.

The powder ingredient in the form of sucrose may be present in the fat-based composition in an amount of 99%, 98%, 97%, 96%, 95%, 90%, 85%, 80%, 75%, 70%, 65%, 60%, 55%, 50%, 45%, 40%, 35%, 30%, 25%, 20%, 15%, 10%, 5%, 4%, 3%, 2%, or 1% by weight. The powder ingredient(s) may also be present in the fat-based composition in an amount by weight within a range formed by a combination of any two values from the above list of percentages. Preferably, the powder ingredient, sucrose, is present in the fat-based composition in an amount sufficient to provide an enhanced sweetening effect.

Advantageously, the fat-based composition of the present invention has a relatively low water content, such as 5 wt % or less, or 4 wt % or less, or 3 wt % or less, or 2 wt % or less, or 1 wt % or less. Most preferably, the fat-based composition of the present invention has a water content of 1 wt % or less.

The fat-based composition of the present invention may be used as a food product itself or further in the manufacture of a food product. In particular, the method of the invention may be used to wholly or partially replace the sugar in a recipe for a food product (i.e. it may be used as a "sugar replacer"). The term "replace" is not intended to be construed such that sugar must be removed from a food product before adding the particulate and powder ingredients according to the invention, rather it is meant that the inventive method is used to add less sugar that would otherwise be used when manufacturing the full-sugar reference food product. When used as a sugar replacer, the method of the invention may be used to replace up to 10%, or up to 20%, or up to 30%, or up to 40%, or up to 50%, or up to 60%, or up to 70%, or up to 80%, or up to 90%, or up to 100% of the sugar in the food product by weight. Advantageously, the present invention provides fat-based composition with reduced sugar, whilst still achieving comparable levels of sweetness, similar levels of sweetness, or enhanced levels of sweetness and preferably still maintaining comparable mouthfeel of sugar, compared to the full-sugar reference.

Advantageously, when the powder ingredient(s) comprises, essentially consists of, or consists of sucrose, the fat-based composition is perceived to have increased creaminess without requiring the addition of any extra fat.

Advantageously, the fat-based composition according to the invention is substantially free of any non-nutritive sweetener, in particular is substantially free of any high-intensity sweetener.

The fat-based composition of the invention may further contain inclusions such as nuts, cereals e.g. puffed cereals, chocolate chips, sugar chips, fruit pieces, caramel pieces, biscuits, wafers, creams or the like.

The fat-based composition can be selected from:
a filling,
a coating,
a spread,
a dip,
an enrobing composition,
wherein any of the above may also optionally comprise cocoa solids and/or cocoa butter.

The fat-based composition can also be selected from:
a chocolate comprising cocoa solids and cocoa butter,
a chocolate-like composition comprising cocoa solids,
wherein any of the above may also optionally comprise dairy-based powder or plant-based dairy-alternative powder.

3.2. Filling Composition

As used herein, the term "'filling" means an edible substance or mixture used to fill a cavity in another food item. Examples of fillings are peanut butter filling, praline filling, cocoa filling, bonbon filling, caramel filling, butter cream filling, cereal filling, fillings for extruded snacks, fillings for chocolate bars, savoury fillings, fillings for jellies or chewing gums, fillings for wafers, fillings for biscuits, fillings for sandwich cookies. Preferably, the filling of the present invention is a confectionery filling.

Dairy-based powder can be selected from whey powder, whole milk powder or skimmed milk powder.

The filling composition can comprise cocoa solids and/or cocoa butter to form a cocoa filling composition.

3.3. Coating Composition

As used herein, the term "coating" means a layer of an edible substance or mixture which is applied as a layer onto a food item. The layer can be applied as a liquid or as a solid. Optionally, the coating is applied to only portions of the food item. The coating can completely encase the food item and thus encapsulate the food item. One example of a coating is icing or frosting which is a sweet, often creamy, glaze typically made of sugar with a liquid (water or milk) that is often enriched with ingredients such as butter, egg whites, cream cheese or flavourings. The coating composition can comprise cocoa solids and/or cocoa butter to form a cocoa coating composition or chocolate-like composition.

The coating composition can be used to coat both frozen and non-frozen confectionery.

Examples of frozen confectionery include ice-cream, ice-cream bars, extruded ice-cream products, ice-cream cakes, frozen cakes, frozen chocolate bars, frozen candies, frozen pastries, frozen sweet pies etc.

Examples of non-frozen confectionery include candy bars, cookies, biscuits, wafers, cakes, muffins, chocolate bars, such as Mars® bar, Snickers® bar, Milkyway® bar and the like, pastries, sweet pies etc.

3.4. Spread Composition

As used herein, the term "spread" means a food product that is literally spread, typically with a knife onto another food item such as e.g. bread or crackers. For the purpose of the present invention, a spread does not include margarine. Preferred spreads of the present invention include chocolate spreads, nut-based spreads (peanut butter spread, almond butter spread, hazelnut spread), speculoos spreads, savoury spreads. The fat-composition according to the invention can also be combined with other spreads.

3.5. Chocolate and Chocolate-Like Compositions

The chocolate or chocolate-like composition is preferably a milk chocolate, dark chocolate, couverture chocolate, white chocolate or red/ruby chocolate. Fat-based compositions which are chocolates and chocolate-like compositions comprise cocoa solids, either in the form of cocoa powder or cocoa liquor, and optionally cocoa butter.

3.5.1. The Fat

The chocolate or chocolate-like composition comprises at least one fat. The fat may be cocoa butter, butterfat, a cocoa butter equivalent (CBE), a cocoa butter replacer (CBR), a vegetable fat that is liquid at standard ambient temperature and pressure (SATP, 25° C. and 100 kPa) or any combination of the above. The chocolate composition preferably comprises cocoa butter.

CBE'S are defined in Directive 2000/36/EC as complying with the following criteria:
a) they are non-lauric vegetable fats, which are rich in symmetrical monounsaturated triglycerides of the type POP, POSt and StOSt;
b) they are miscible in any proportion with cocoa butter, and are compatible with its physical properties (melting point and crystallisation temperature, melting rate, need for tempering phase);
c) they are obtained only by the processes of refining and/or fractionation, which excludes enzymatic modification of the triglyceride structure.

Suitable CBE'S include illipe oil, borneo tallow nut oil, tengkawang nut oil, palm oil, sal oil, shea butter, kokum gurgi oil and mango kernel oil. CBE'S are usually used in combination with cocoa butter. Optionally, the chocolate fat-based composition comprises no more than 5 wt % CBE'S.

The fat-based composition may comprise a cocoa butter replacer (CBR) (sometimes known as a cocoa butter substitute (CBS)) in place of some or all of the cocoa butter. Such compositions are sometimes known as compound chocolate or chocolate-like compositions, which may be used as coatings, fillings etc. Suitable CBR's include CBR laurics and CBR nonlaurics. CBR laurics are short-chain fatty acid glycerides. Their physical properties vary within the group but they all have triglyceride configurations that make them compatible with cocoa butter. Suitable CBR's include those based on palm kernel oil and coconut oil. CBR non-laurics consist of fractions obtained from hydrogenated oils. The oils are electively partially or fully hydrogenated with the formation of trans acids, which increases the solid phase of the fat. Suitable sources for CBR nonlaurics include soya, cottonseed, peanut, rapeseed and corn (maize) oil.

The fat-based composition may comprise at least one vegetable fat that is liquid at standard ambient temperature and pressure ((SATP, 25° C. and 100 kPa). A liquid vegetable fat may be employed when a liquid chocolate composition is desired. Suitable vegetable fats include corn oil, cotton seed oil, rapeseed oil, palm oil, safflower oil, and sunflower oil.

The present invention is further applicable to a fat-based composition in which some or all of the fat is constituted by a partly or wholly non metabolizable fat, for example Caprenin.

The chocolate composition or chocolate-like composition of the present invention may also be a reduced-fat chocolate composition.

Optionally, the chocolate composition or chocolate-like composition of the invention may have a total fat content of at least 15 wt %, of at least 17.5 wt %, of at least 19 wt % or of at least 20 wt %. Optionally, the chocolate composition of the invention may have a total fat content of at most 85 wt %, at most 70 wt %, at most 60 wt %, or at most 50 wt %. The fat can be preferably selected from cocoa butter, fractionated palm oil, illipe butter, shea nut butter, fractionated and partially/fully hydrogenated soybean oil, fractionated and partially/fully hydrogenated cottonseed oil, fractionated and partially/fully hydrogenated palm oil, fractionated and partially/fully hydrogenated lauric fat compounds, or combinations of two or more thereof.

Chocolate-like compositions are chocolate compositions, in which at least a part of the cocoa butter in chocolate is replaced by another fat, such as butterfat, or a vegetable fat such as a cocoa butter equivalent (CBE) or cocoa butter replacer (CBR) or other vegetable fats.

3.5.2. Dairy-Based Powder

Milk chocolates and milk chocolate-like compositions comprise dairy-based powders. Suitable dairy-based powders are listed under Section 1.2.5.

Generally, a milk chocolate or a milk chocolate-like composition may comprise from 0.5 to 50 wt %, or 1 to 30 wt %, or 1 to 20 wt % of dairy-based powders. Some dairy-based powders can be used to enhance the sweetness of the composition.

Instead of dairy-based powders, it is also within the scope of the invention to use plant-based dairy alternative powders, e.g. derived from soybean, almonds, rice and the like, to create.

3.5.3. Emulsifier

In order to improve the viscosity during processing of the chocolate or chocolate-like composition, at least one emulsifier will normally be included as an ingredient. Suitable emulsifiers are listed under Section 1.2.6. For chocolate and chocolate-like compositions, it is preferred to use at least one or more of (fractionated) lecithin, polyglycerol polyricinoleate (PGPR), ammonium phosphatide, and mono- and diglycerides as the emulsifier.

Typically, a chocolate or chocolate-like composition can comprise from 0.1 to 5 wt % of lecithin.

3.5.4. Preparing Chocolate and Chocolate-Like Fat-Based Compositions

Processes for producing chocolate and chocolate-like compositions typically involve dispersing ingredients into a fat phase, following by refining, conching and tempering. In the method according to the invention, steps (c) and (d) are preferably carried out after any conching (including liquification).

The ingredients for chocolate and chocolate-like compositions generally include cocoa solids (cocoa powder or cocoa liquor), sucrose and optionally dairy-based powder. The ingredients that are used are dictated by the nature of the product:

A typical commercial dark chocolate will normally comprise cocoa solids, fat, sugar and emulsifier;

A typical commercial milk chocolate will normally comprise cocoa solids, fat, dairy-based (or plant-based dairy alternative) powder, sugar and emulsifier, optionally wherein some of the fat can be dairy fat;

A typical commercial white chocolate will normally comprise dairy-based powder, fat, sugar and emulsifier. White chocolate is prepared without the addition of cocoa mass or cocoa powder.

A chocolate or chocolate-like composition preferably has a fat content of from at least 15%, at least 20%, at least 25%, or at least 30% and up to at most 85%, at most 70%, at most 60%, or at most 50%.

Additional Step b') Conching

The term "conching", as used herein, will be understood by those skilled in the art and refers to a flavour-developing step which involves the intimate mixing or kneading of the chocolate ingredients, typically at elevated temperatures. Conching is preferably carried out prior to addition of the powder ingredient(s) i.e. step (c).

Optional Step e) Solidifying

In order to obtain an ambient chocolate or chocolate-like composition i.e. which is solid at room temperature (20-25° C.), a final step is applied to solidify the chocolate or chocolate-like composition. The solidification of chocolate and chocolate-like compositions is also called "tempering".

4. Uses of the Invention

The invention also covers the use of at least one powder ingredient, preferably comprising, essentially consisting of or consisting of at least one nutritive sweetener, having a particle size distribution D90 of less than 30 μm, preferably less than 20 μm, and at least one particulate ingredient, preferably comprising, essentially consisting of or consisting of at least one bulking agent, in the manufacture of a food product for reducing the sugar and/or calorie content of the full-sugar reference food product. The nutritive sweetener is preferably a disaccharide, more preferably sucrose. The bulking agent is preferably a soluble fibre, more preferably resistant dextrin. Optionally, the use includes maintaining comparable sweetness and/or mouthfeel of the full-sugar reference food product.

Optionally, the use includes maintaining comparable sweetness and/or mouthfeel in comparison to the full-sugar reference food product.

The invention also covers the use of the fat-based composition according to the invention for reducing the sugar and/or calorie content of a full-sugar reference food product, whilst preferably maintaining comparable sweetness and/or mouthfeel of said full-sugar reference food product.

The invention also covers a food product comprising the fat-based composition according the invention and other ingredients, wherein the food product is preferably selected from the group consisting of frozen and non-frozen confectionery (chocolate confectionery, sugar confectionery and the like), baked goods (pastries, cakes and the like), biscuits and wafers, and dairy products.

The present invention allows to prepare a fat-based filling more efficiently, since the powder ingredient is added after the refining steps, reducing the dry substance of the initial mixture. Thus, the refining step may be carried out with less energy input.

5. Materials and Methods

Measuring D90 and D50 Particle Size Distributions

The particle size distribution of a sample may be measured by laser light diffraction, for example using a Mastersizer 3000 system (Malvern). This equipment allows the measurement of particles with sizes ranging from 0.1-3500 microns. The system includes a:

Helium Neon red laser (633 nm, max 4 mW) along with a 10 mW 470 nm blue LED light source and a wide angle detection system (0.015-144 degrees).

Hydro MV medium volume automated liquid sample dispersion unit or Hydro SM manual liquid sample dispersion unit for measurements in liquid (Oil, solvents, water)

Aero S automated dry powder dispersion system with a venturi disperser.

Prior to sample measurement a background measurement (duration 10 s or longer) may be carried out.

Preferred settings for measurements:

Particle type: non-spherical

Particle optical parameters:Refractive index (RI) and Absorption index (AI) of the sample.

Calculation: Mie theory

Optical parameters of background medium: Refractive index (RI) Absorption index (AI) of the medium: Air for powder measurement, dispersant for measurements in liquid.

As mentioned earlier, the machine is equipped with two different modules enabling the measurement of particles size distribution in dry or dispersed in liquid. The choice of the method (dispersion in air or in liquid) depends on the particles' capability to disperse in air or in a liquid. The choice of the dispersion media should not affect the size and/or the shape of the particles. In the present invention the dispersion mediums used are air in the case of the Aero S module and oil in the case of the Hydro SM module.

Preferred settings of the measurement with the Aero S module:

Feed rate: 0-100% (optimized to obtain obscuration range 0.5-15%)

Air pressure: 0-3 bar

Obscuration: range 0.5-15%

Amount of sample: 1-20 g of sample is added to the venturi dispenser

Measurement duration: time needed to measure the whole sample that was added to the venturi dispenser Settings of the measurement with the Hydro SM module:

Obscuration: range 2-20%—Sample is added to the liquid sample dispersion unit until the obscuration is in range (See table 1)

Stirring speed: 1000-3000 rpm

Measurement duration: 10 s or longer

TABLE

| Obscuration settings for Mastersizer 3000 system | |
| --- | --- |
| SIZE | OBSCURATION |
| very fine (<1 μm) | <5% |
| fine (1-100 μm) | 5-10% |

TABLE-continued

| Obscuration settings for Mastersizer 3000 system | |
| --- | --- |
| SIZE | OBSCURATION |
| coarse (1000 μm) | 10-20% |
| very polydisperse (>1000 μm) | 10-20% |

The volumetric particles size distribution is calculated from the intensity profile of the scattered light with the Mie theory by use of the software accompanying the machine. The following parameters, among others, are automatically generated by the software:

D [v,0.1]: is the volume diameter where 10% of the volume distribution is below this value (D [v,0.1]).

D [v,0.5]: is the volume median diameter where 50% of the volume distribution of the particles is above and 50% is below this value (D [v,0.5]).

D [v,0.9]: is the volume diameter where 90% of the volume distribution is below this value (D [v,0.9]). This is the D90 particle size in accordance with the present invention.

The features disclosed in the foregoing description, or the following clauses and claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended clauses and claims is not intended to be limited solely to these embodiments. The clauses and claims are to be construed literally, purposively, and/or to encompass equivalents.

EXAMPLES

1. White Fat-Based Fillings

1.1. Raw Materials and Recipes

The nutritional profile of the ingredients used in for the tested recipes below can be found in Table 1a and Table 1b. All amounts are provided in percent by weight (dry substance).

TABLE 1a

| Ingredient | Manufacturer | % fat | % sugars* | % fibres | % protein |
| --- | --- | --- | --- | --- | --- |
| Icing sugar | Tiense suiker | | 100 | | |
| Silk sugar | British sugar | | 100 | | |
| Cremoflex L1904 | Cargill | 100 | | | |
| Whole milk powder (26% fat) | Armor Proteins | 26 | 40 | | 28 |
| Skimmed milk powder (0% fat) | Armor Proteins | | 54 | | 36 |
| Anhydrous milk fat | Friesland Campina | 100 | | | |
| Resistant Dextrin | Cargill | | 10 | 75 | |
| Soya lecithin | Cargill | 100 | | | |
| Natural vanilla | Kerry | | | | |

*Mono- and disaccharides

TABLE 1b

| Ingredient | Manufacturer | % other carbohydrates | % minerals | % water | % milk solids | % sucrose |
|---|---|---|---|---|---|---|
| Icing sugar | Tiense suiker | | | | | 100 |
| Silk sugar | British sugar | | | | | 100 |
| Cremoflex L1904 | Cargill | | | | | |
| Whole milk powder (26% fat) | Armor Proteins | | 2 | 4 | 100 | |
| Skimmed milk powder (0% fat) | Armor Proteins | 2 | 2 | 6 | 100 | |
| Anhydrous milk fat | Friesland Campina | | | | 100 | |
| Resistant Dextrin | Cargill | 10 | | 5 | | |
| Soya lecithin | Cargill | | | | | |
| Natural vanilla | Kerry | | | | | |

A reference recipe (Tables 2a and 2b) was designed to test different ingredients to achieve 30% sugar reduction, the limit for a packaging claim regarding sugar reduction. All amounts are provide in percent by weight.

TABLE 2b

| Nutritional profile of composition | % |
|---|---|
| Fat % | 37.54 |
| Sugars %* | 52.1 |
| Fibre % | 0 |
| Protein % | 8.17 |
| Other carbohydrates % | 0.4 |
| Minerals | 0.5 |
| Water | 0.96 |
| Calories | 580.54 |

*Mono- and disaccharides

TABLE 2a

REFERENCE RECIPE

| Ingredient | % |
|---|---|
| Icing sugar | 40 |
| Cremoflex L1904 | 34.6 |
| Whole milk powder (26% fat) | 10 |
| Skimmed milk powder (0% fat) | 15 |
| Soya lecithin | 0.3 |
| Natural vanilla | 0.1 |

To achieve 30% sugar reduction, the reference recipe was adapted to evaluate the ingredient performance on sugar reduction.

In all recipes below resistant dextrin was used as bulking agent in a fixed percentage (17.5%). Variables are icing sugar (R1) and silk sugar (R2) as shown in Tables 3a and b and Table 4a and b. In R2 all of the icing sugar was replaced with resistant dextrin and silk sugar. Both recipes result in the same amount of sugar and calorie reduction. All amounts are provide in percent by weight.

TABLE 3b

| Nutritional profile of composition | % |
|---|---|
| Fat % | 37.54 |
| Sugars %* | 36.47 |
| Fibre % | 13.13 |
| Protein % | 8.08 |
| Other carbohydrates % | 2.15 |
| Minerals | 0.50 |
| Water | 1.65 |

TABLE 3b-continued

| Nutritional profile of composition | % |
|---|---|
| Calories | 550.87 |
| Sugar reduction | −30.01% |
| Calorie reduction | −5.11% |

*Mono- and disaccharides

TABLE 3a

RECIPE R1

| Ingredient | % |
|---|---|
| Icing sugar | 22.75 |
| Resistant dextrin | 17.5 |
| Silk sugar | 0 |
| Cremoflex L1904 | 34.6 |
| Whole milk powder (26% fat) | 10 |
| Skimmed milk powder (0% fat) | 14.75 |
| Soya lecithin | 0.3 |
| Natural vanilla | 0.1 |

TABLE 4a

RECIPE R2

| Ingredient | % |
|---|---|
| Icing sugar | 0 |
| Resistant dextrin | 17.5 |
| Silk sugar | 22.75 |
| Cremoflex L1904 | 34.6 |
| Whole milk powder (26% fat) | 10 |
| Skimmed milk powder (0% fat) | 14.75 |
| Soya lecithin | 0.3 |
| Natural vanilla | 0.1 |

TABLE 4b

| Nutritional profile of composition | % |
|---|---|
| Fat % | 37.54 |
| Sugars %* | 36.47 |
| Fibre % | 13.13 |
| Protein % | 8.08 |
| Other carbohydrates % | 2.15 |
| Minerals | 0.50 |
| Water | 1.65 |
| Calories | 550.87 |
| Sugar reduction | −30.01% |
| Calorie reduction | −5.11% |

*Mono- and disaccharides

1.2. Preparation of the White Fat-Based Filling

In a first step, dry ingredients are weighed out and mixed. A partial amount of the total fat is added. To avoid a sandy mouthfeel in fat-based confectionery products, the particle size of the mixture needs to be reduced down to a D90 of not more than 35 μm by a method known as refining. Roll-refining of the mixture was carried out on a Buhler SDY-200. For these trials a particle size distribution D90 of 25-30 μm was targeted. Particle size was measure with a micrometer as described in the description above.

In the last step, the remaining powder ingredients are added and mixed for 15 minutes at speed 3 (see FIG. 1).

For full evaluation of ingredient performance, the dosing order of the raw material was varied using two different methods:

Method 1: This is the conventional method. All dry ingredients were blended together in step 1 and the normal process was followed. This method was applied for the REFERENCE RECIPE and for RECIPE R1.

Method 2: This is the method according to the invention. Particulate ingredients were added in step 1 i.e. soluble fibre (resistant dextrin) and the milk powders were mixed with a partial amount of the total fat. The mixture was refined. The remaining fat was then added and mixed. Finally, the silk sugar and emulsifier were added in step 4 and mixed. This method was applied for RECIPE R2.

Prior to division in small portions the white fat-based fillings were stored at 50° C. 20 g of sample was put in a sample container and then cooled in order to induce crystallization for 30 min at 12° C. After this crystallization step, samples were stored at 20° C.

After this process, samples were stored at controlled conditions for evaluation.

1.3. Sensory Evaluation

Reducing the sugar impacts on the sensorial properties of the white fat-based fillings. Following sensorial parameters were therefore evaluated:

Sweetness perception
Milk taste
Creaminess
Off taste

Samples were presented blind coded and randomized by a full trained sensory panel.

In total 5 samples were tested using a blind code. Participants were asked to rank the samples on a scale from 1 to 10 for different parameters. Individual scores were averaged.

REFERENCE RECIPE
RECIPE R1 (Resistant dextrin only)
RECIPE R2 (Resistant dextrin and silk sugar)

Result from the tasting session are displayed in Table 5 below:

TABLE 5

| Sample | Sweetness | Creaminess | Milk taste | Off taste |
|---|---|---|---|---|
| REFERENCE RECIPE | 8.0 | 7.7 | 6.7 | 0.9 |
| RECIPE R1 | 5.9 | 5.0 | 5.3 | 0.8 |
| RECIPE R2 | 8.1 | 8.7 | 5.6 | 0.6 |

Differences are clearly visible. RECIPE R1, which represents a known method of sugar reduction, partially replaces standard sugar with a bulking agent prior to the refining step. However, this RECIPE R1 performs much worse than the REFERENCE RECIPE. In particular, the sweetness perception is much reduced.

RECIPE R2 according to the invention clearly ranks higher than RECIPE R1, even though both have the same sugar reduction of 30%. This shows that the method and the particle size of the sucrose play an important role in the sweetness perception and texture of the final product. The REFERENCE RECIPE and RECIPE R2 have comparable scores on sweetness perception, milk taste and off taste. Surprisingly, RECIPE R2 scores even better on creaminess than the REFERENCE RECIPE. This is an added advantage. Normally, the fat content would need to be increased in order to improve on the creaminess of a fat-based filling.

Clauses

The invention covers the following;

Clause 1: A method for preparing a fat-based composition comprising the following steps:
   a. providing a mixture comprising fat and at least one particulate ingredient;
   b. refining the mixture to a particle size distribution D90 of less than 40 μm, preferably less than 35 μm, more preferably less than 30 μm;
   c. adding at least one powder ingredient to the refined mixture, wherein the powder ingredient(s) has a particle size distribution D90 of at most 30 μm;
   d. mixing the refined mixture with the powder ingredient(s).

Clause 1a: A method for preparing a fat-based composition comprising the following steps:
   a. providing a mixture comprising fat and at least one particulate ingredient;
   b. refining the mixture to a particle size distribution D90 of less than 40 μm, preferably less than 35 μm, more preferably less than 30 μm;
   c. adding at least one powder ingredient to the refined mixture, wherein the powder ingredient(s) has a particle size distribution D90 of at most 30 μm;
   d. mixing the refined mixture with the powder ingredient(s).
wherein the particulate ingredient is soluble fibre and the powder ingredient is sucrose.

Clause 1b: A method for preparing a fat-based composition comprising the following steps:
   a. providing a mixture comprising fat and at least one particulate ingredient;
   b. refining the mixture to a particle size distribution D90 of less than 40 μm, preferably less than 35 μm, more preferably less than 30 μm;
   c. adding at least one powder ingredient to the refined mixture, wherein the powder ingredient(s) has a particle size distribution D90 of at most 30 μm;
   d. mixing the refined mixture with the powder ingredient(s).
wherein the particulate ingredient is resistant dextrin and the powder ingredient is sucrose.

Clause 2: The method according to clause 1, wherein the powder ingredient is selected from nutritive sweeteners and bulking agents and combinations of two or more thereof, preferably selected from sucrose, maltose, dextrose, fructose, lactose, allulose, isomalt, isomaltulose, maltitol, mannitol, erythritol, xylitol and combinations thereof, more preferably the powder ingredient is sucrose.

Clause 3: The method according to any one of the preceding clauses, wherein the powder ingredient has a particle size distribution D90 of at most 25 μm, preferably at most 20 μm.

Clause 4: The method according to any one of the preceding clauses, wherein the powder ingredient has a particle size distribution D50 of at most 10 μm, preferably at most 9 μm, more preferably at most 8 μm.

Clause 5: The method according to any one of the preceding clauses, wherein the particulate ingredient is selected from bulking agents, nutritive sweeteners, non-nutritive sweeteners, dairy-based powders and combinations of two or more thereof.

Clause 6: The method according to any one of the preceding clauses, wherein the particulate ingredient is a bulking agent selected from a soluble fibre selected from resistant dextrin, resistant starch, polydextrose, fructo-oligosaccharide, gluco-oligosaccharide, galacto-oligosaccharide, mannose-oligosaccharide, β-glucan, galactomannan, pectin, psyllium, inulin, resistant starch, a trisaccharide and combinations of two or more thereof, preferably the bulking agent is a resistant dextrin, a polydextrose or two or more thereof.

Clause 7: The method according to any one of the preceding clauses, wherein the particulate ingredient is a bulking agent selected from an insoluble fibre selected from cereal bran, bamboo fibre, fruit fibre, sugar beet fibre, sugar cane fibre, tomato fibre, coconut fibre, straw from cereals such as wheat or barley, pea fibre, tea, coffee, potato fibre, cocoa, cocoa powder, bran waste, sugar waste, cocoa waste, corn-cob waste, cellulose, hemi-cellulose, chitosan, pectins, gums, mucilages, lignins and combinations of two or more thereof.

Clause 8: The method according to any one of the preceding clauses, wherein the fat-based composition further comprises one or more of cocoa solids, emulsifiers, flavours, colours, additives, texturizing agents and inclusions, such as fruits and nuts.

Clause 9: The method according to clause 8, wherein the fat-based composition further comprises cocoa solids and optionally cocoa butter and wherein the method further comprises a step (b') of conching the mixture after step (b) and prior to step (c); and optionally a step (e) of solidifying the mixed refined mixture to obtain a chocolate or chocolate-like composition.

Clause 10: The method according to any one of clauses 1 to 9, wherein the composition is selected from:
a filling,
a coating,
a spread, including chocolate or hazelnut spreads,
a dip,
a chocolate, or
a chocolate-like composition.

Clause 11: The method according to any one of clauses 1 to 10 for preparing a sugar-reduced fat-based composition in comparison with a full-sugar reference food product.

Clause 12: A fat-based composition comprising sucrose having a particle size distribution D90 of less than 30 μm, preferably less than 20 μm, fat, and at least one particulate ingredient selected from bulking agents such as soluble fibres, including resistant dextrin, and wherein the fat-based composition is preferably obtainable according to any one of the preceding clauses. The fat-based composition can be a chocolate or chocolate-like composition, a filling, a coating, a spread, including chocolate or hazelnut spreads, a dip, a chocolate, or a chocolate-like composition.

Clause 13: Use of at least one powder ingredient, preferably comprising, essentially consisting of or consisting of at least one nutritive sweetener, having a particle size distribution D90 of at most 30 μm, preferably at most 20 μm, and at least one particulate ingredient, preferably comprising, essentially consisting of or consisting of at least one bulking agent, in the manufacture of a fat-based composition for a food product for reducing the sugar and/or calorie content of the food product in comparison to a full-sugar reference food product, wherein the nutritive sweetener is preferably a disaccharide, more preferably sucrose, and the bulking agent is preferably a soluble fibre, more preferably resistant dextrin.

Clause 13a: Use of sucrose having a particle size distribution D90 of at most 30 μm, preferably at most 20 μm, and soluble fibre in the manufacture of a fat-based composition for a food product for reducing the sugar and/or calorie content of the food product in comparison to a full-sugar reference food product.

Clause 13b: Use of sucrose having a particle size distribution D90 of at most 30 μm, preferably at most 20 μm, and resistant dextrin in the manufacture of a fat-based composition for a food product for reducing the sugar and/or calorie content of the food product in comparison to a full-sugar reference food product.

Clause 13c: The use according to clauses 13, 13a or 13b, wherein the sucrose is added after the refining step in the manufacture of a fat-based composition.

Clause 14: The use according to clauses 13, 13a, 13b or 13c whilst maintaining comparable sweetness and/or mouthfeel of the full-sugar reference food product.

Clause 15: Use of the composition according to clause 12 for reducing the sugar and/or calorie content of a full-sugar reference food product, whilst preferably maintaining comparable sweetness and/or mouthfeel of said full-sugar reference food product.

Clause 16: A food product comprising the composition according to clause 12 and other food ingredients, wherein the food product is preferably selected from the group consisting of frozen and non-frozen confectionery, baked goods, biscuits and wafers, breakfast cereals, cereal bars, and dairy products.

Clause 17: A process for preparing a food product comprising combining the composition according to clause 12 with other food ingredients.

Clause 18: A process for preparing a food product comprising the method of any one of clauses 1 to 11, wherein the obtained fat-based composition is combined with other food ingredients.

The invention claimed is:

1. A method for preparing a fat-based composition comprising the following steps:
a. providing a mixture comprising fat and at least one particulate bulking agent selected from the group consisting of a resistant dextrin, a polydextrose, or combinations thereof;
b. refining the mixture to a particle size distribution D90 of less than 40 μm;
c. adding at least one powder ingredient to the refined mixture, wherein the powder ingredient(s) has a particle size distribution D90 of at most 30 μm and is selected from the group consisting of sucrose, maltose, dextrose, fructose, lactose, allulose, isomalt, isomaltulose, maltitol, mannitol, erythritol, xylitol, and combinations thereof;
d. mixing the refined mixture with the powder ingredient(s).

2. The method according to claim 1, wherein the powder ingredient has a particle size distribution D90 of at most 25 μm.

3. The method according to claim 1, wherein the powder ingredient has a particle size distribution D50 of at most 10 μm.

4. The method according to claim 1, wherein the fat-based composition further comprises one or more of cocoa solids, emulsifiers, flavours, colours, additives, texturizing agents, and inclusions.

5. The method according to claim 4, wherein the fat-based composition further comprises cocoa solids and optionally cocoa butter and wherein the method further comprises a step (b') of conching the mixture after step (b) and prior to step (c); and optionally a step (e) of solidifying the mixed refined mixture to obtain a chocolate or chocolate-like composition.

6. The method according to claim 1, wherein the composition is selected from:

a filling,
a coating,
a spread, including chocolate or hazelnut spreads,
a dip,
a chocolate, or
a chocolate-like composition.

7. The method according to claim 1, wherein the method is a method for preparing a sugar-reduced fat-based composition.

8. The method according to claim 1, wherein step (b) comprises refining the mixture to a particle size distribution D90 of less than 30 μm.

9. The method according to claim 1, wherein the powder ingredient has a particle size distribution D90 of at most 20 μm.

10. The method according to claim 1, wherein the powder ingredient has a particle size distribution D50 of at most 8 μm.

* * * * *